United States Patent [19]
Bernard et al.

[11] 3,849,836
[45] Nov. 26, 1974

[54] RIB CUTTING APPARATUS

[75] Inventors: Vincent E. Bernard, Cedar Falls;
Duane F. MacGregor, Bancroft,
both of Iowa

[73] Assignee: Container Corporation of America,
Chicago, Ill.

[22] Filed: Dec. 20, 1973

[21] Appl. No.: 426,816

[52] U.S. Cl. ............................ 17/1 R, 17/23, 17/52,
83/1, 83/368
[51] Int. Cl. .............................................. A22b 5/20
[58] Field of Search .......... 17/1 R, 45, 23, 52; 83/1,
83/4, 433, 428, 368

[56] References Cited
UNITED STATES PATENTS

| | | | |
|---|---|---|---|
| 3,546,737 | 12/1970 | Neebel et al. | 17/1 R |
| 3,771,196 | 11/1973 | Doerfer et al. | 17/1 R |
| 3,789,456 | 2/1974 | Doerfer et al. | 17/1 R |

*Primary Examiner*—Richard C. Pinkham
*Assistant Examiner*—James D. Hamilton
*Attorney, Agent, or Firm*—Carpenter, Ostis & Lindberg

[57] ABSTRACT

An animal processing machine including rib cutting apparatus constructed and arranged so as to optimize the rib portion cut from an animal side. The rib cutting apparatus includes a frame having a conveyor movable thereon and operable to convey an animal side to a rib cut knife. The animal side is urged against the conveyor, and the rib cut knife is mounted at an angle relative to the direction of conveyor travel, and is adapted to be tilted relative to the animal side so as to cut along a line corresponding to the brisket of the rib section. The knife is also twisted throughout its length, so as to provide an optimum amount of lean meat in the belly severed from the rib section. Additionally, the rib knife is initially oriented to sever the brisket or breast bone from the belly, so that the belly will be free from undesirable brisket bone.

This twist function makes this initial orientation possible while providing a subsequent change in attitude relative to the animal side which increases the lean meat left on the portion which subsequently is converted to bacon.

7 Claims, 13 Drawing Figures

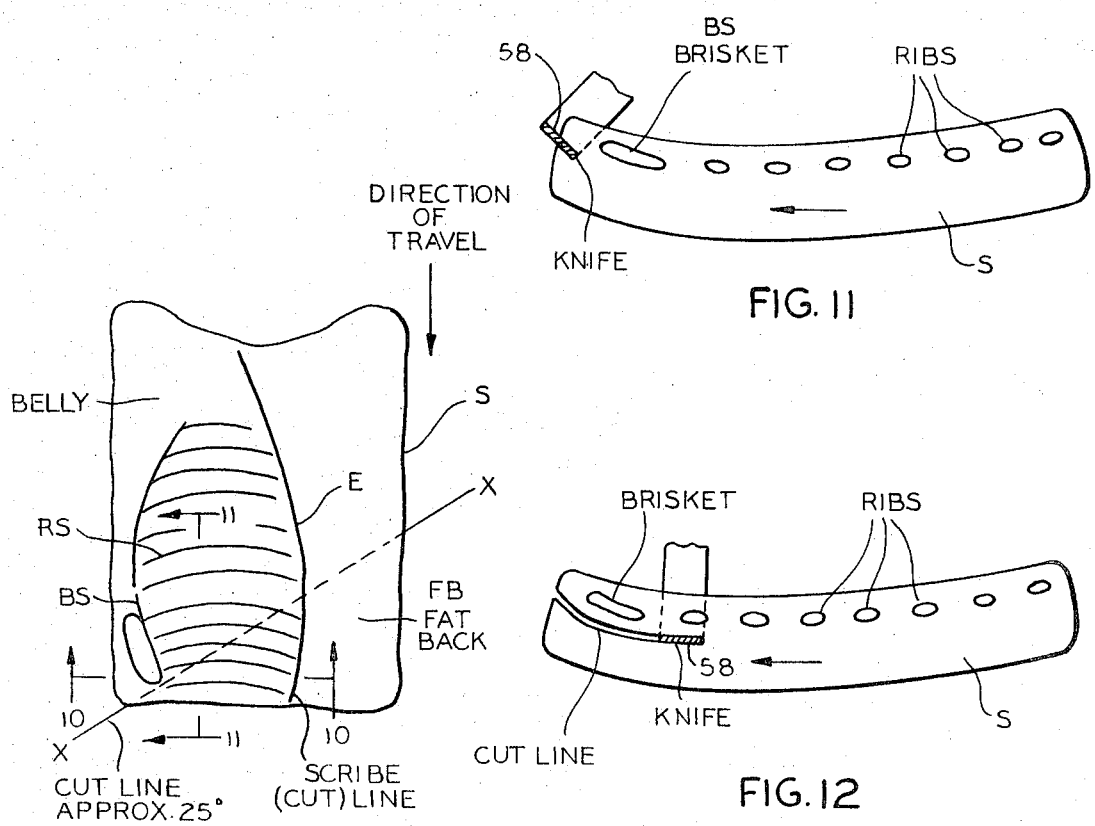
FIG. 9
FIG. 11
FIG. 12
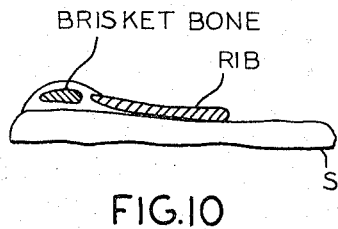
FIG. 10
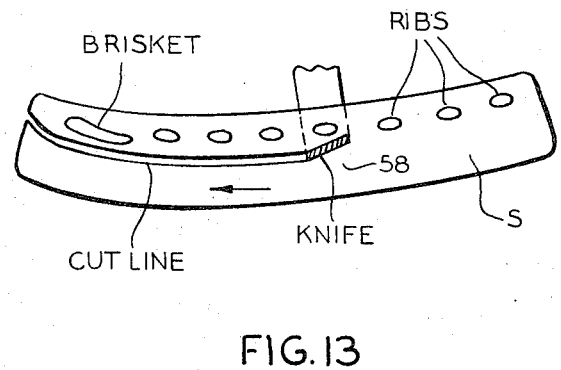
FIG. 13

RIB CUTTING APPARATUS

BACKGROUND OF THE INVENTION

This invention relates to an animal side processing machine and more particularly to an improved rib cutting apparatus in such machine for optimizing the rib cut from the animal side.

This application discloses an improvement over the invention disclosed in Doerfer et al. application Ser. No. 178,914, filed Sept. 9, 1971 for "Rib Cutting Apparatus" and since matured into Pat. No. 3,789,456.

A principal object of the present invention is to provide an improved animal side processing machine having a rib cutting apparatus which incorporates means for tilting and twisting the rib cut knife and improve control of the tilt function, so as to optimize the quality of a rib portion removed from the animal side, without adversely affecting the quality of the belly of the animal side.

THE DRAWINGS

FIG. 9 is a schematic plan view of an animal side from which the loin has been removed;

FIG. 10 is a section taken along the line 10—10 of FIG. 9 looking in the direction of the arrows;

FIG. 11 is a section taken along the line 11—11 of FIG. 10 looking in the direction of the arrows;

FIG. 12 is a view similar to FIG. 11 but showing the changed attitude of the rib cutting knife as it advances with respect to the moving ribs and belly, and FIG. 13 is a similar view showing a further changed attitude of the rib cutting knife.

Figure 1:
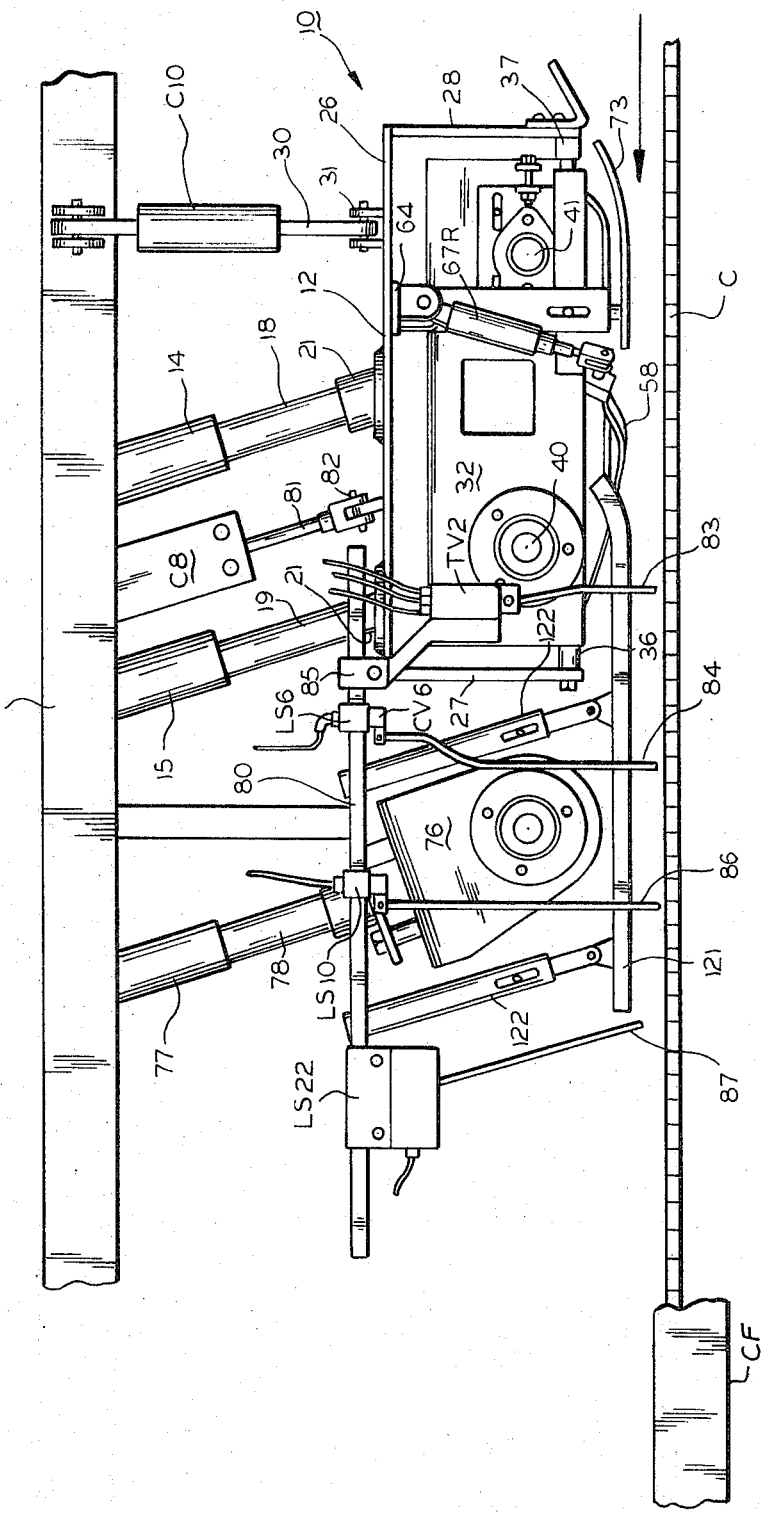
FIG. 1 is a side elevation view of a portion of an animal side processing machine, illustrating the improved rib cutting apparatus according to the present invention.
Figure 2:
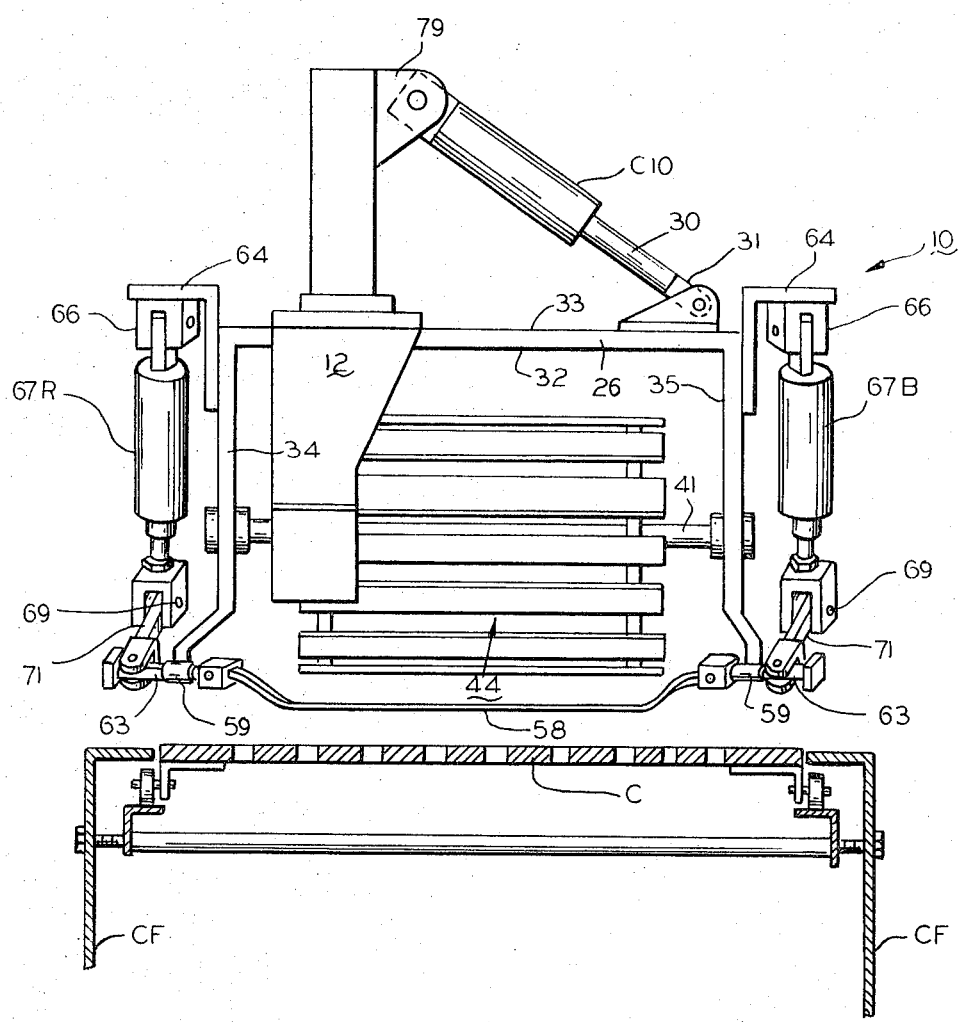
FIG. 2 is an end elevation view of the rib cutting apparatus looking from the right to the left as seen in FIG. 1.
Figure 3:
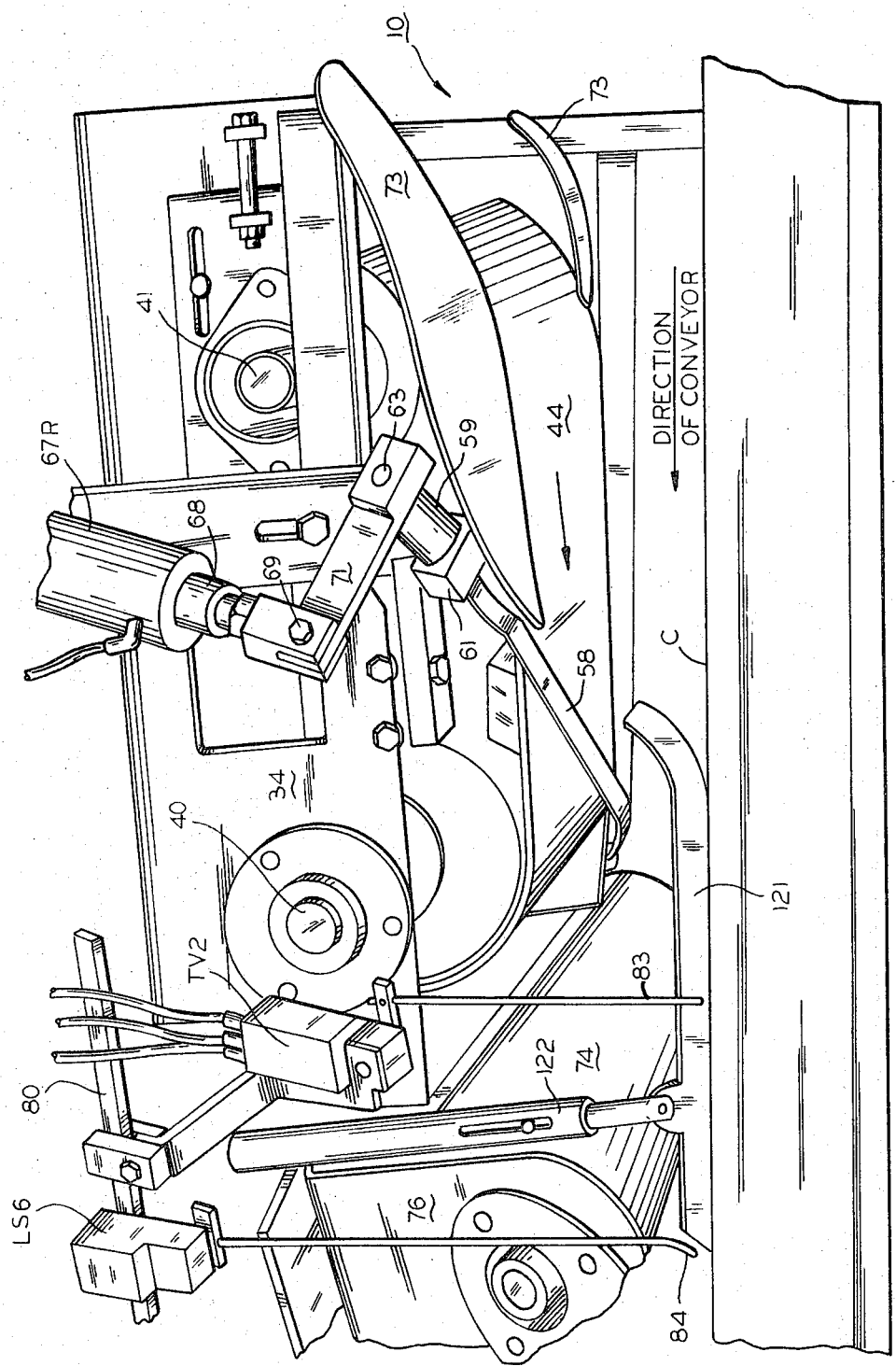
FIG. 3 is an side elevation view of the rib cutting apparatus showing the same in raised position.

Referring to FIGS. 1, 2 and 3, the rib cutting apparatus according to the present invention is denoted by the reference numeral 10. It is operable to remove the ribs as a unit from an animal side from which the loin has been removed as is disclosed in U.S. Pat. No. 3,546,737. After the loin has been removed from the animal side, there remains, see FIG. 9, a rib section, the fat back and the belly, as shown.

Rib cutting apparatus 10 comprises a support frame 12 mounted for vertical movement toward and away from an animal side conveyor C moving along a conveyor frame CF by guide means which include guide tubes 14, 15 connected to an upper frame 16. The support frame 12 is supported for movement in a vertical plane by a pair of members 18,19 telescoping within guide tubes 14,15. The lower end of each telescoping member 18,19 is connected to a bracket 21 secured to the top of support frame 12. The latter is generally U-shaped in longitudinal section and has a top member 26 and depending spaced-apart arms 27 and 28.

Structure is provided for raising and lowering the support frame 12 in a generally vertical plane. Such structure comprises a fluid motor C8 secured at its upper end to the upper frame 16 and having a piston rod 81 connected at one end to a piston movable therewithin. Piston rod 81 is secured at 82 to support frame 12.

A framework 32 having a top 33 and sides 34 and 35 is pivotally supported on frame 12 by pivot pins 36,37 extending from the sides 27,28 and journaled in the support frame 12. Thus, framework 32 can pivot relative to support frame 12 about an axis through pivot pins 36,37.

Structure is provided for imposing tractive effort on an animal side being transported on conveyor C. To this end sides 34, 35 of framework 32 supports shafts 40,41 for driving a power-driven slat conveyor 44 which applies uniform traction on the top of an animal side, holding it to the conveyor C during the rib cutting operation. Details of slat conveyor 44 are more clearly shown in the aforesaid Doerfer et al. application Ser. No. 178,914.

Structure is provided for supporting a rib knife 58 at the lower reaches of framework 32. Rib knife 58 has its longitudinal axis arranged diagonally to the direction of travel of conveyor C so as to enter the animal side S at one corner thereof rather than along the entire leading edge thereof. This is shown in FIG. 9. Rib knife 58 is supported near its ends in journals 59, see FIGS. 2 and 4, affixed to bracket 64. The knife is mounted at each end in supports 61, and it is retained in position by a keeper 62. Support 61 is part of a stub shaft 63 journaled in journal 59, and structure is provided to impart longitudinal torsion to knife 58 for a purpose as will appear.

Accordingly, frame members 34 and 35 each have the brackets supports 64 secured to outboard sides thereof, and each bracket support 64 affords a pivotal connection 66 to respective fluid motors 67B and 67R having a piston rod 68 therewith and connected pivotally at 69 to a rocker arm 71. A clevis 72 at each end of rocker arm 71 has a pin connection 72 to the stub shaft 63 at each end of knife 58. Fluid motor 67B is related in its position to the brisket side of rib section RS, see FIG. 9 and fluid motor 67R is related in its position to the rib ends E resulting from the operation of the scribe saw disclosed in Neebel et al. Pat. No. 3,546,737.

A fat deflector 73 is secured to the framework 32 upstream of knife 58 as seen in FIGS. 1 and 3 and compresses the fatback FB of the side S, see FIG. 9, and protects the knife 58 from cutting the fatback area which is generally beneath the area of the side or edge denoted E at the right hand of the side S seen in FIG. 9. The designation E represents the sawed ends of the ribs and the fatback area would be that below the fat deflector 73. The upstream end of the deflector 73 is curved upwardly so as to appropriately receive an animal side thereunder.

Cylinder C8 functions as an air spring, and piston rod 81 thereof and frame 12 are able to move up and down relative to conveyor C to accommodate variations in thickness of the side S.

Figure 4:
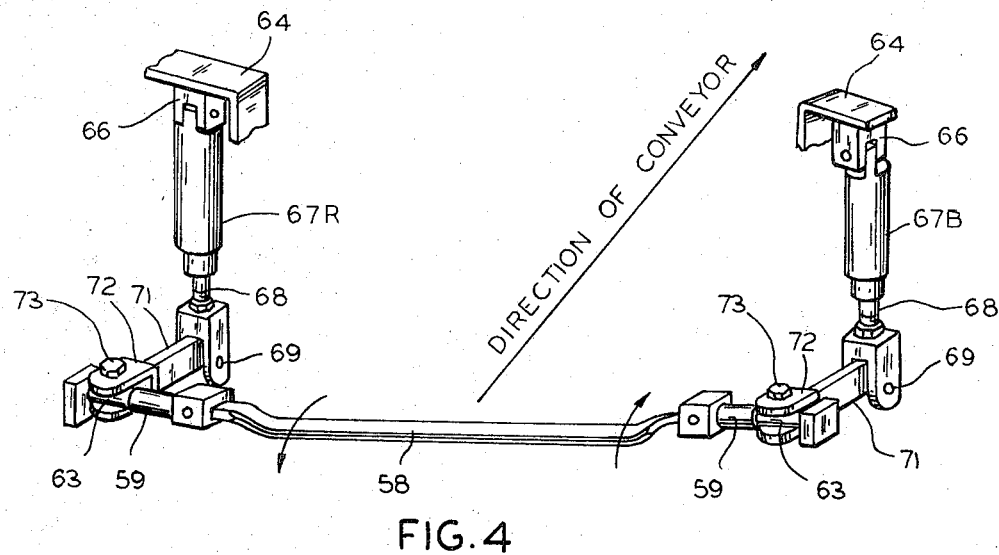
FIG. 4 is a perspective view of the rib cutting knife incorporated in the apparatus of FIGS. 1 to 3.
Figure 5:
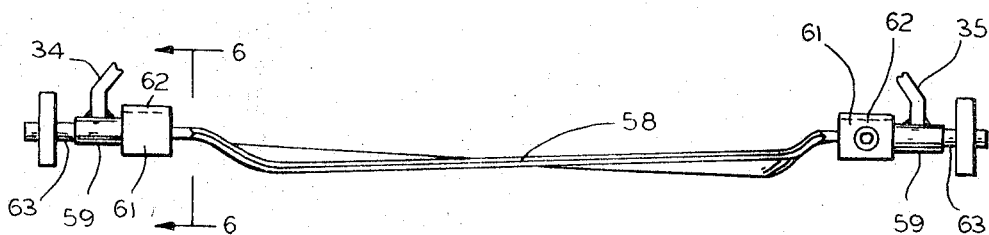
FIG. 5 is an elevational view of the rib cutting knife showing the same in twisted condition.
Figure 6:
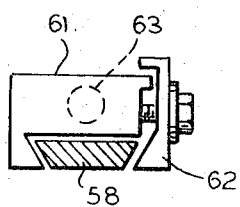
FIG. 6 is a view taken along the line 6—6 of FIG. 5 showing details of structure for holding the rib cutting knife at its ends.

As seen in FIGS. 4 and 5, knife 58 is torsionally strained by proper operation of the fluid motors 67B and 67R. Such twisting is followed by tilting of the frame 32 in a counter-clockwise fashion as seen in FIG. 2, so that the right hand end of the knife 58 seen in said figure is elevated. As the knife 58 is tilted and twisted as described, the operation is such as to cause the side S to be cut closely along the line BS which represents the sternum or brisket and the costal cartilage of rib section RS as seen in FIG. 9. Line E, it may again be noted, is the scribe line resulting from operation of a scribe saw in separating the loin, ribs and backbone from the animal side as is described in the aforementioned Neebel et al patent.

The attitude of knife 58 at the left hand end thereof is seen in FIG. 9, which corresponds to the right end as seen in FIG. 2, and is such as to cut the brisket bone away from the belly underlying the rib section RS, the presence of the brisket bone in the belly minimizing the value of same.

The attitude of knife 58 with respect to the brisket bone BS is best seen with respect to FIGS. 11 and 12, and it is operable to cut beneath brisket BS. As side S moves along conveyor C and knife 58 moves past brisket BS, the attitude of knife 58 changes, particularly as seen in FIGS. 12 and 13, the knife path being as close as possible to the underside of the ribs seen. The rib knife 58 is automatically positioned vertically by the thickness of the side S and it cuts immediately under the ribs R. The angle at which the rib cutting knife 58 is set, and the angle at which the edge is sharpened are such as to satisfy the requirement that knife 58 cuts as close to the underside of the ribs as possible.

A belly drive drum 74, see FIGS. 1 and 3, is disposed downstream from the support frame 12, and belly drive drum 74 is supported in a belly drum frame 76. The latter in turn is connected to a telescoping guide 77 having a guide member 78 slidable therewithin and connected to frame 76. Details of such structure are to be found in the aforesaid Doerfer et al. application.

Structure is provided for tilting the rib cut knife 58 relatively to animal side to follow the curve of the brisket BS seen in FIG. 9. Such structure comprises a fluid motor C10 pivotally secured at one end to a bracket 79 suitably affixed to the support frame 12. Motor C10 has a piston rod 30 connected by a clevis 31 to the frame 32. Actuation of the cylinder C10 will pivot frame 32 about the axis through pivot pins 36, 37 so as to raise the end of the knife 58 at the brisket BS.

Control of the elements comprising the apparatus 10 for cutting the rib section RS from the side S is accomplished by sensor members connected in fluid and electrical circuitry as now will be described. To this end frame 16 is provided with a support arm 80 extending lengthwise of the frame 12 and downstream of conveyor C. A bracket 85 is supported on arm 80, and it in turn adjustably supports a mechanical sensor 83 for actuating a valve TV2 which controls the operation of the knife twist cylinders 67B and 67R. A sensor 84 connected to a switch LS6 mounted on arm 80 controls tilting of frame 32. A sensor 86 located downstream of sensor 84 actuates a switch LS10 located on arm 80 to control lifting of frame 12 at the end of the rib cutting operation, and a sensor 87 located downstream of sensor 86 actuates switch LS22 to reset the apparatus at the end of the rib cutting operation for a subsequent operation.

Figure 8:
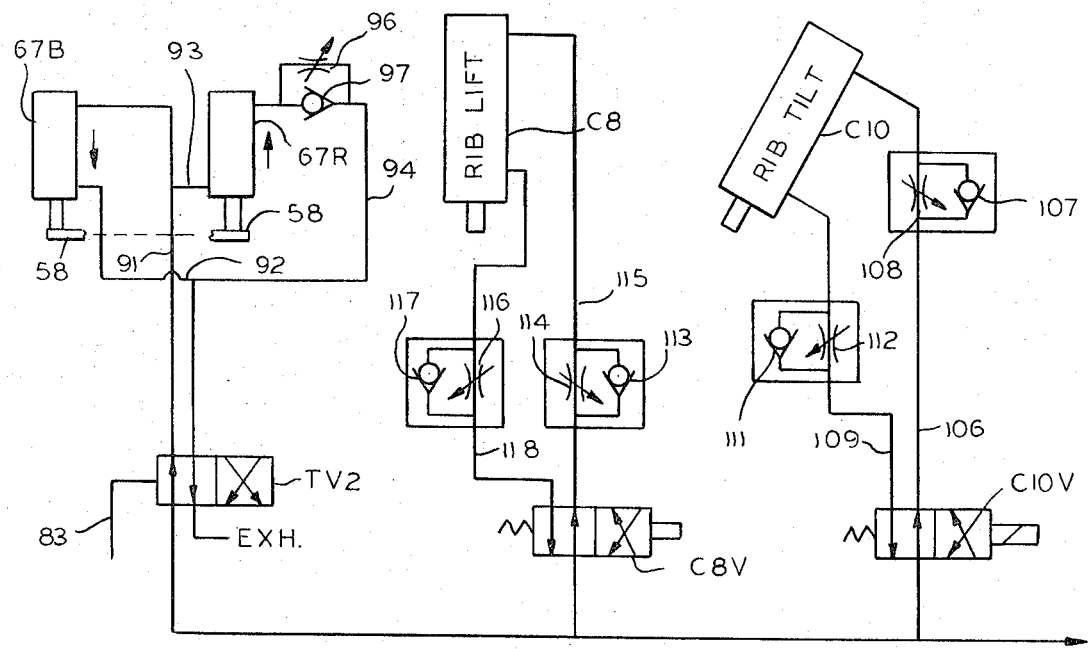
FIG. 8 is a schematic showing certain elements controlled by the circuit of FIG. 7.

As the animal side consisting of the fat back, rib section and the belly approaches the apparatus 10 from the right as seen in FIG. 1, and contacts mechanical sensor 83, valve TV 2 supported on bracket 85 is operated. Valve TV 2 is connected in a fluid circuit as seen in FIG. 8. Upon operation of valve TV2 fluid is passed from the supply seen via a line 91 to cylinder 67B, the operation of cylinder 67B causing the end of the knife 58 thereof to be twisted in the direction as shown by the arrow thereat in FIG. 4. The piston rod end of cylinder 67B is connected by a line 92 to exhaust through valve TV2. At the same time twist cylinder 67R is operated in an oppoiste twisting direction as seen in FIG. 4, a line 93 branching from line 92 being connected to the piston rod end of cylinder 67R. Fluid is exhausted from cylinder 67R via a line 94 having a flow regulating valve 96 and a check valve 97 therewithin. Flow valve 96 regulates the rate of twisting of the rib end of knife 58 to adjust the cutting angle of knife 58 beneath the ribs seen in FIGS. 11, 12 and 13.

Sensor 83 remains in contact with the side S during its traverse beneath frame 12.

Immediately after initiating the twist function just described, and as the side S moves with conveyor C, the leading end of side S contacts sensor 84, and the tilt function of frame 32 is started. It is tilted by cylinder C10, so that knife 58 follows the brisket and costal cartilage BS. The twist and tilt are maintained until the belly completely passes through the rib apparatus 10.

Figure 7:
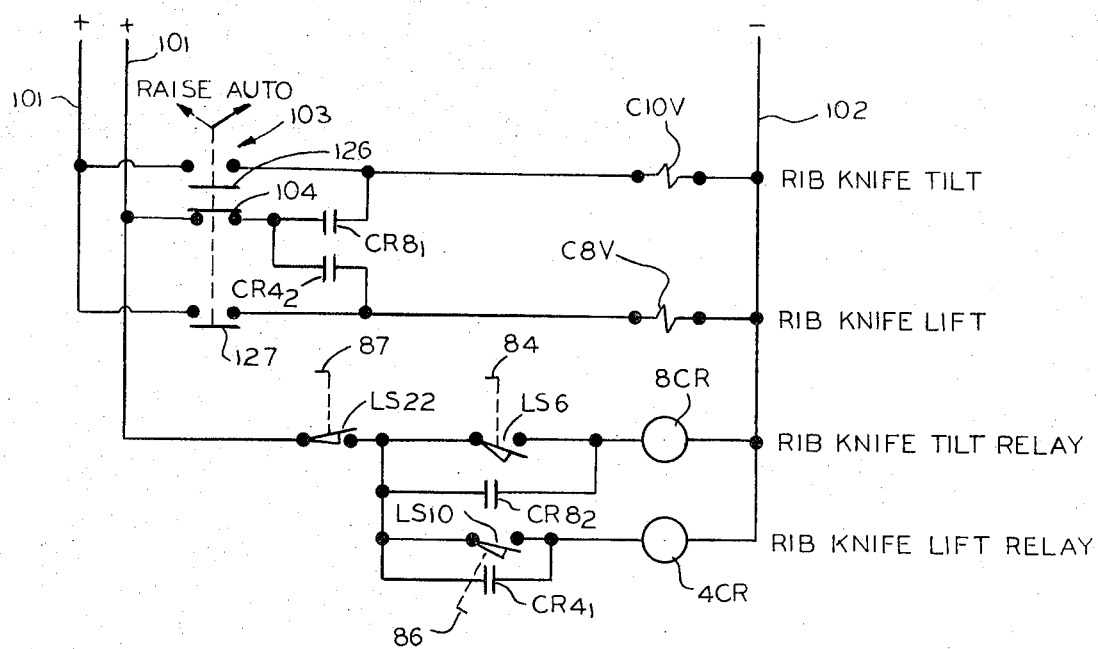
FIG. 7 is a circuit diagram for controlling operation of various elements of the apparatus seen in FIGS. 1 to 6.

The sensors 84, 86 and 87 are part of circuitry seen in FIG. 7 wherein there is shown a pair of main power leads 101 and 102. A gang switch 103 shown has automatic and raised positions, and when in the automatic position shown a contact 104 thereof is closed. When sensor 84 is triggered, switch LS6 is closed, it being in series with normally closed reset switch LS22 controlled by sensor 87. At such time relay 8CR is energized, and it closes a normally open contact $CR8_1$ and a holding contact $CR8_2$ which maintains relay 8CR energized irrespective of the condition of switch LS6.

Upon energization of relay 8CR solenoid valve C10V is actuated. It is connected in the supply line seen in FIG. 8, and a pressure line 106 is connected between it and tilt cylinder C10, there being a check valve 107 connected in shunt with a flow regulating valve 108 in line 106. The operating rate of tilt cylinder C10 is controlled by an exhaust line 109 having a check valve 111 connected in shunt with a flow regulating valve 112 in line 109, check valve 111 blocking flow in the described condition of valve C10V.

As the frame 32 is tilted by cylinder C10 the end of knife 58 follows a curved line at line BS seen in FIG. 9. After the brisket side is cut, the knife 58 is untwisted, the side S having moved past sensor 83 thereby operating valve TV2 in an opposite direction.

Following the untwisting of knife 58, frame 32 is reverted back to its untilted position by side having moved past sensor 84 and returning to its unactuated position. This would normally deenergize relay 8CR but for the continued closing of holding contacts $CR8_2$, and when the side moves along conveyor C to contact sensor 86 a switch LS10 is closed thereby. Switch LS22 being closed and in series with switch LS10, relay 4CR is energized, closing a holding contact CR4₁ thereof and a contact CR4₂ connected to line 101 through contacts 104. A solenoid valve C8V is then energized, and is connected in the supply line seen in FIG. 8. Pressure fluid is supplied to cylinder C8 by a line 115 having a check valve 113 connected in shunt with a flow regulating valve 114 therein. Exhaust of fluid from cylinder C8 is regulated by a flow control valve 116 and a shunt check valve 117 connected in a return line 118.

A sensor 86 is actuated and the rib has been severed from side S frame 12 is lifted and knife 58 is lifted out of contact with side S.

The apparatus is reset by actuating sensor 87 which opens normally closed switch LS22 to thereby deenergize 8CR and 4CR to return the frames 12 and 32 to the lowered position to resume operations on a successive side S.

The helper drum 74 then continues movement of the side S from which the rib has been severed but which still remain on the belly and fatback.

It may be noted that the side S moves beneath a spring biased hold down shoe 121 supported on spring biased guides 122 in turn supported from member 80.

The gang switch 103 has a "raise" position to raise frame 12. In the "raise" position a contact 126 is closed and solenoid valve C8V is actuated. At the same a contact 127 is closed to valve C10V. In such position contact 104 is opened.

We claim:

1. In an animal side processing machine having a frame and a conveyor movable with respect to said frame for conveying an animal side having a rib section therein remaining after previously cutting the loin therefrom, apparatus for cutting the remaining rib section from said animal side including the brisket thereof from said remaining animal side, said apparatus comprising:
   a. a rib knife support frame including a rib knife mounted thereon;
   b. means for tilting said rib knife support frame so that the end of the rib knife adjacent said brisket is raised by an amount whereby the rib knife follows the curve of said brisket and the corresponding ends of said ribs;
   c. means for twisting said rib knife along the longitudinal axis thereof so as to present a cutting edge adjacent one end of said knife at an attitude to cut beneath the brisket of said rib section and close thereto and subsequently to change its attitude concomitantly with the change in attitude of said tilting means so as to cause said rib knife to emerge out of the remaining animal side and cause lean meat to remain intact therein.

2. Apparatus according to claim 1 wherein means are provided for moving said rib knife support frame relative to said rib section.

3. Apparatus according to claim 1 wherein said rib cut knife is disposed at an angle relative to the direction of travel of said conveyor, and includes means for raising said rib cut knife from the animal side after the rib cut knife has cut a rib section.

4. Apparatus according to claim 1 wherein said rib knife twisting means comprises cylinders mounted on said rib support frame.

5. Apparatus according to claim 4 including control means responsive to the position of said animal side for actuating said twisting means thereby changing the orientation of said rib cut knife relative to said rib section.

6. Apparatus according to claim 1 including control means responsive to the location of said animal side for actuating said orientation changing means for properly moving said rib cut knife relative to said rib section.

7. Apparatus according to claim 1 wherein said conveyor means includes additional conveyor means mounted on said rib knife support frame for applying uniform traction on the top of said animal side for holding said animal side to the conveyor during the rib cutting operation.

* * * * *